United States Patent [19]

Howie, Jr.

[11] Patent Number: 4,923,325
[45] Date of Patent: May 8, 1990

[54] FRICTION FIT KNOB

[75] Inventor: Robert K. Howie, Jr., Decatur, Ill.

[73] Assignee: The Grigoleit Company, Decatur, Ill.

[21] Appl. No.: 335,107

[22] Filed: Apr. 7, 1989

Related U.S. Application Data

[63] Continuation-in-part of Ser. No. 201,969, Jun. 3, 1988, abandoned.

[51] Int. Cl.$^5$ .............................................. B25G 3/02
[52] U.S. Cl. ..................................... 403/361; 16/121; 74/553; 292/349
[58] Field of Search .................. 292/349, 353; 16/121, 16/118; 74/553; 403/361

[56] References Cited

U.S. PATENT DOCUMENTS

| | | |
|---|---|---|
| 3,667,787 | 6/1972 | Seymour ............................ 16/121 X |
| 3,679,252 | 7/1972 | Howie, Jr. . |
| 3,880,536 | 4/1975 | Petrus . |
| 4,094,210 | 6/1978 | Wirtz et al. ........................... 74/553 |
| 4,179,771 | 12/1979 | Rankins et al. . |
| 4,295,246 | 10/1981 | Howie, Jr. . |
| 4,441,230 | 4/1984 | Howie, Jr. . |

FOREIGN PATENT DOCUMENTS

1317446  5/1973  United Kingdom .................. 16/121

*Primary Examiner*—Andrew V. Kundrat
*Attorney, Agent, or Firm*—Kinzer,Plyer,Dorn,McEachran & Jambor

[57] ABSTRACT

A molded knob of the type which frictionally engages and slips over the end of a shaft. The knob has a hub with a shaft-receiving socket formed therein. Elongated fingers, which are formed as part of the hub, extend into the socket to engage the shaft. In one embodiment of the invention, a pair of elongated fingers extend generally radially into the socket, with each finger terminating in a tip located close to but out of contact with the top of the other finger. The tips of the fingers are contacted by the curved outer surface of the shaft when the shaft is inserted in the socket to compress the fingers. If desired, the fingers can be designed to bend them into contact with each other so that the loading from one finger to the other acts like a truss. In a second embodiment of the invention, the elongated fingers are curved non-radially relative to the shaft and extend toward each other, terminating short of contact with the tips of each other. In the third embodiment, the fingers are also curved and extend non-radially relative to the shaft. A first rib is formed on each finger near its tip with each rib projecting into the socket. The first ribs are engaged by the curved outer surface of the shaft to bend the curved fingers away from the flat wall, with the amount of projection of the first ribs determining the amount of bending of the fingers. The fingers also may have second ribs near their bases which are also engaged by the shaft to create a controlled interference fit between the shaft and each of the second ribs. In all embodiments, the tips of the fingers may be notched at the entrance to the socket for a depth of approximately one quarter of the depth of the socket to facilitate the insertion of the shaft into the socket by virtually eliminating friction drag on the shaft during the piloting of the shaft into the socket.

7 Claims, 2 Drawing Sheets

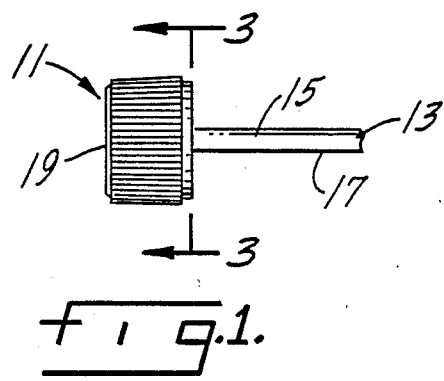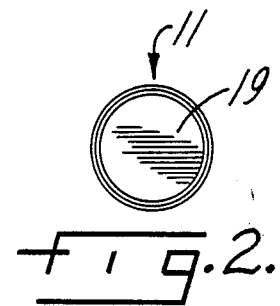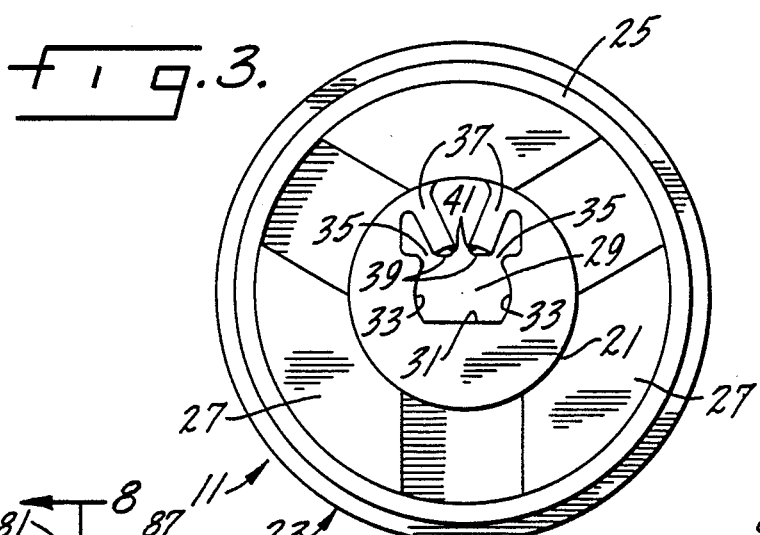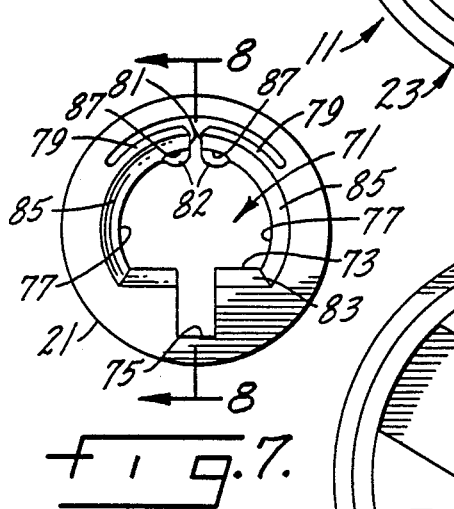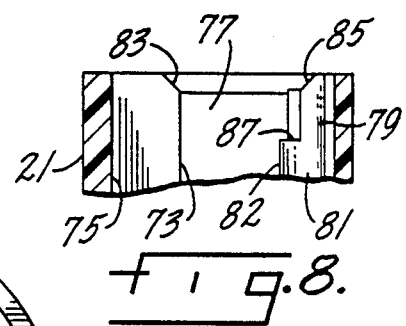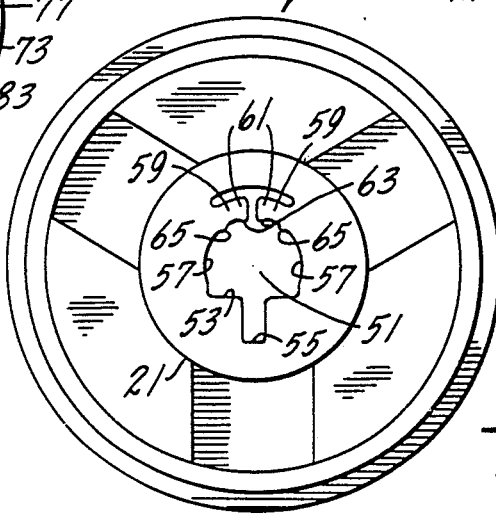

FRICTION FIT KNOB

This application is a continuation-in-part of my co-pending application Ser. No. 201,969, filed June 3, 1988 now abandoned.

BACKGROUND AND SUMMARY OF THE INVENTION

The molded plastic knobs of this invention are of the general type of friction fit knobs shown and described in U.S. Pat. No. 3,679,252 of Robert K. Howie, Jr.; U.S. Pat. No. 4,179,771 of Paul Rankins and Robert K. Howie, Jr.; U.S. Pat. No. 4,295,246 of Robert K. Howie, Jr.; and U.S. Pat. No. 4,441,230 of Robert K. Howie, Jr., all of which are assigned to the assignee of this application.

An object of this invention is a friction fit knob having force applying fingers which are resistant to creep during the long term application of force to the shaft.

Another object of this invention is a friction fit knob having force applying fingers positioned so that the insertion of the shaft into the socket compresses the fingers in a columnar direction.

Another object of this invention is a friction fit knob having force applying fingers which are positioned relative to each other such that the contact of the curved outer surface of the shaft with the fingertips when the shaft is inserted in the socket will both compress the fingers in an end-to-end direction and bend the fingers into contact with each other so that the load will be applied from one finger to another as in a bridge truss.

Another object of this invention is a friction fit knob having resilient fingers which extend generally tangentially to the shaft with ribs formed on each finger near its tip, the ribs being engaged by the curved outer surface of the shaft when the shaft is inserted in the socket to bend the curved fingers away from the shaft, with the amount of projection of the ribs toward the shaft determining the amount of bending of the fingers and thus the force applied by the fingers to the shaft.

Another object of this invention is a friction fit knob having tensioning fingers with a rib formed on each finger near its base. The rib is engaged by the shaft to create a line of interference between the shaft and the rib to provide a friction fit which does not require an undue amount of force to insert the shaft into the socket but resists pull-out of the shaft.

Another object of this invention is a friction fit knob having force applying fingers in which the tips of the fingers are notched for a prescribed depth at the entrance to the socket to facilitate the insertion of the shaft into the socket by virtually eliminating friction drag on the shaft during the piloting of the shaft into the socket.

Other objects may be found in the following specification, claims and drawings.

BRIEF DESCRIPTION OF THE DRAWINGS

The invention is illustrated more or less diagrammatically in the following drawings wherein:

FIG. 1 is a side elevational view of a knob of this invention mounted on a shaft;

FIG. 2 is a front end view of a knob of this invention;

FIG. 3 is an enlarged rear view of the knob taken along line 3—3 of FIG. 1;

FIG. 6 is an enlarged rear view of a modified form of a knob of this invention;

FIG. 7 is an enlarged rear view of the hub of another modified form of a knob of this invention; and FIG. 8 is a partial, cross-sectional view taken along line 8—8 of FIG. 7.

DESCRIPTION OF THE PREFERRED EMBODIMENTS

Figure 4:
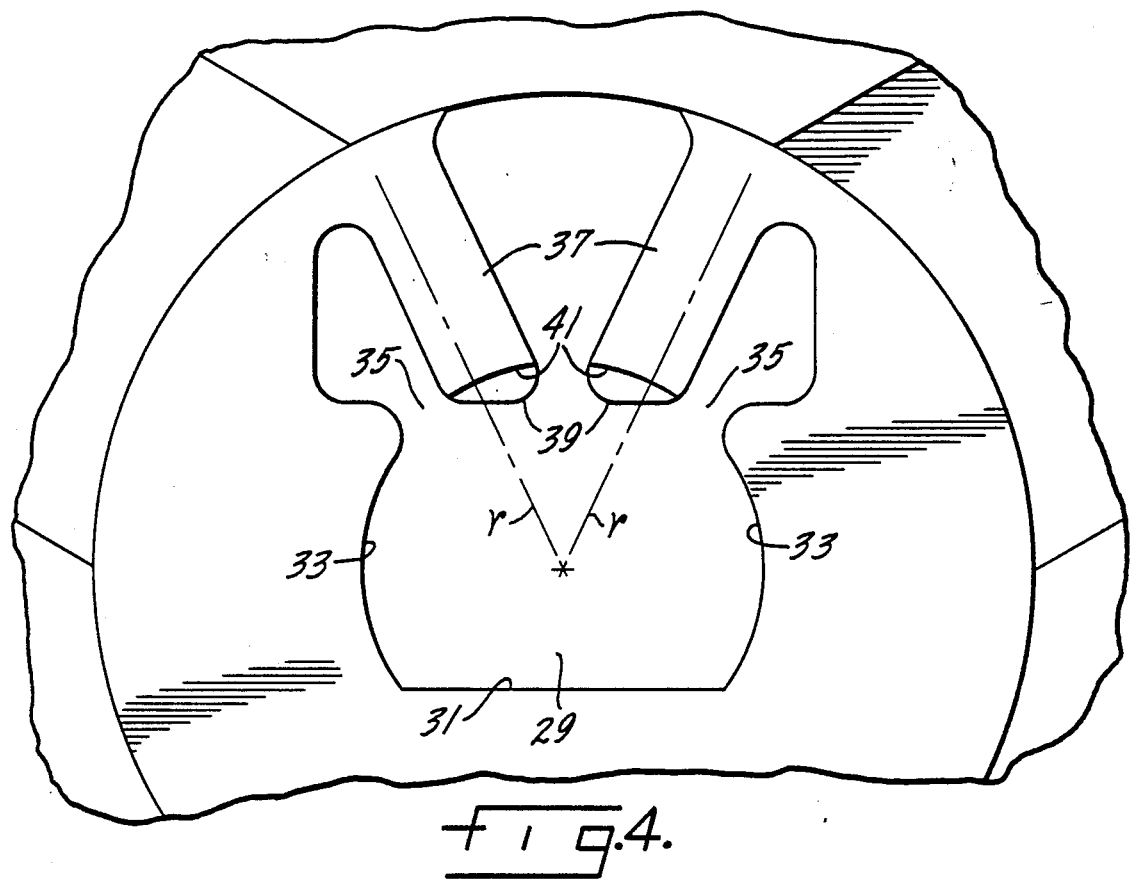
FIG. 4 is an enlarged, partial, rear view of the knob
Figure 5:
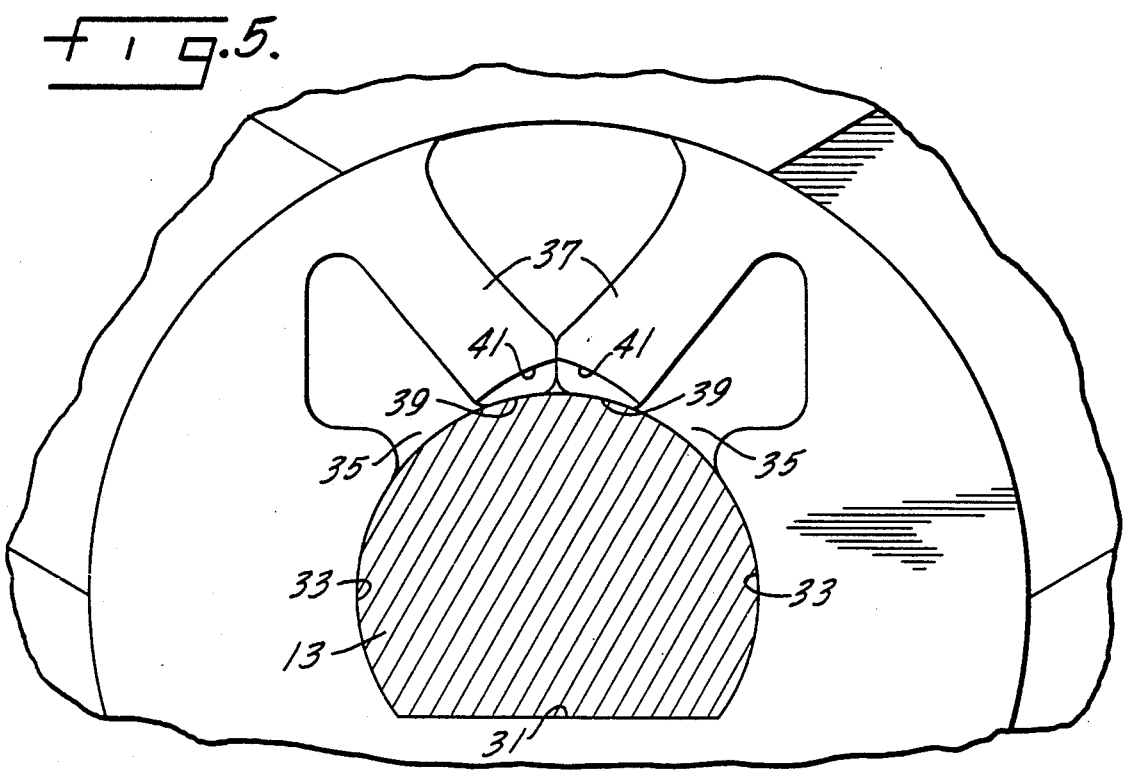
FIG. 5 is an enlarged, partial, rear view of the knob of FIG. 3, with a shaft fully inserted in the socket.

FIGS. 1, 2, 3, 4 and 5 of this invention show a first embodiment of a molded knob 11 containing the novel features of this invention mounted on a shaft 13. The shaft is customarily made of metal and may be solid or hollow and has a generally cylindrical outer surface 15 with one flat side 17. The shaft 13 is only one example of the many types of shafts which can be used with the molded knobs of this invention and this invention is also applicable to entirely round shafts. It should be understood that such a shaft may be formed as an integral part of the device that it operates such as a switch or valve or the like.

The knob 11 of this invention may be molded from a thermoplastic material such as nylon or other suitable thermoplastic material. The knob shown in this drawing is cylindrical in shape and has a decorative metal end cap 19. A knob of this type is used on a radio, television or other pieces of electronic equipment. However, the invention is adaptable to other types of knobs such as those used on household appliances, etc.

A knob, whatever its purpose or shape, usually includes a hub 21 or the equivalent thereof. Sometimes the entire knob is the hub. In the embodiments of the invention shown herein, the hub is formed as the interior core of a larger cylinder 23. The outer wall 25 of the cylinder is molded integrally with the hub and is joined thereto by longitudinally-extending webs 27. The surface of the outer wall 25 may be knurled for gripping purposes.

The hub 21, which is generally cylindrical in shape, has a shaft-receiving socket 29 formed therein. The socket, which is of irregular transverse cross-section, has a flat wall 31 on one side thereof extending into the socket. The socket 29 also includes oppositely-located curved side walls 33 which extend from the flat wall and terminate short of each other to leave an opening 35 between them. Extending into the opening 35 and inclined toward each other are a pair of generally radially-extending elongated fingers 37 which are formed integrally with the hub. The fingers extend into the socket essentially the full depth thereof. Each finger terminates in a tip 39, which is located close to but away from the tip of the other finger. Each tip 39 is not perfectly semi-circular but extends toward the shaft 13 a somewhat greater distance on the side of each finger 37 located adjacent to the other finger 37.

As can be best seen in FIG. 4 of the drawings, each finger 37 is offset from a radius "r" in the direction of the other finger. This asymmetrical positioning causes the fingers to move toward each other when the shaft 13 is inserted into the socket. At the entrance to the socket, the fingertips are notched at 41 for a depth of approximately one quarter of the depth of the socket to facilitate the initial insertion of the shaft into the socket, an assembly step usually referred to as "piloting". The inside diameter of the notched entrance 41 is dimensioned to provide a slip fit engagement with a shaft 13 having the maximum outside diameter permitted within the range of tolerances for the shaft. The notching of the fingertips and the dimensioning of the entrance to the socket virtually eliminates any friction drag during the piloting of the shaft and thus greatly facilitates this step.

When a shaft 13 is inserted into the socket 29, it will be guided into contact with the tips 39 of the fingers 37 by the notched outer ends 41 of the tips so that the curved outer surface 15 of the shaft will contact the tips 39 of the fingers. Because the tip 39 of each finger 37 is slightly longer on the side of the finger adjacent the other finger 37 and the fingers are offset toward each other relative to a radius line "r", the initial engagement of the shaft 13 with the fingertips 39 will create moment arms which will bend the fingers 37 toward each other. The initial bending of the fingers, which occurs upon insertion of the shaft 13 into the socket 29, will reduce the amount of force needed to seat the shaft into the socket. After the initial bending of the fingers, the continued engagement of the shaft with the fingers will compress the fingers to provide a holding force which will not loosen due to creep. The fingers may be designed so that the shaft forces the fingers into contact with each other to the positions shown in FIG. 5 of the drawings in which the bending force applied to each finger 37 by the shaft 13 is transferred to the other finger in a manner similar to a bridge truss. The compression of the fingers lengthwise exerts a holding pressure on the shaft 13. Because thermoplastic materials of which knobs are generally made have less creep in compression than in tension, the compressed fingers 37 are less likely to relax than bent fingers under long term loading. Also, the engagement of one finger with the other forms a truss-like angle which limits compression of the fingers.

A stop (not shown) is molded in the socket to engage the shaft to prevent it from extending to the bottom of the shaft. The fingers 37 extend into the socket beyond the stop to provide flexibility throughout their entire contact with the shaft.

FIG. 6 of the drawings shows a knob 11 having a hub 21 in which there is provided a modified socket 51. The socket 51, which is of irregular transverse cross-section, has a flat wall 53 on one side thereof extending into the socket. A coring slot 55 intersects this flat wall and extends into the socket. The socket also includes oppositely-located curved walls 57. Extending out of these curved walls and toward each other on the opposite side of the socket from the flat wall 53 are curved elongated fingers 59 which extend non-radially to the socket 51. These fingers terminate in tips 61 which are located close to but out of contact with each other. The fingers 59 extend substantially the full depth of the socket 51. A stop is provided in the socket to prevent the shaft 13 from being inserted to the bottom of the socket, but this is not shown in the drawings. Flexibility of the fingers 59 is obtained without requiring the ends of the fingers to terminate short of the bottom of the socket because the shaft cannot reach the bottom of the socket.

A first rib 63 is formed on each finger 59 near its tip, with the rib projecting into the socket 51 toward the flat wall 53 and extending along its length into the socket substantially to the bottom thereof. The first rib 59 is formed with a sufficient cross-section that it will not be crushed or scraped away upon insertion of the shaft 13 into the socket 51. The amount of projection of the rib into the socket will determine the amount of bending of its finger and thus the amount of holding force exerted against the shaft 13 by each finger.

The socket 51 is dimensioned so that at its minimum inside diameter (minimum tolerance) it will provide a slip fit with a shaft 13 built to its maximum outside diameter (maximum tolerance). When the inside diameter of the socket is larger than its minimum diameter or when the outside diameter of the shaft is smaller than its maximum diameter, there will be no loading on the socket wall and all loading will be on the finger 59. Such a loose fitting shaft will have a tendency to wobble or rock, especially during the application of torque. To eliminate this problem, a second rib is provided on each finger.

A second rib 65 is formed on each finger 59 near its base, with the second rib projecting into the socket 51 toward the flat wall 53 and also extending into the socket substantially to the bottom thereof. The second rib is sized to engage the shaft 13 when the outside diameter of the shaft is at its minimum tolerance size to provide a line of interference engagement between the shaft and hub of the knob. The cross-section of the second rib is made so as to minimize the amount of force required to insert the shaft into the socket while still providing at least a line of interference engagement between the second rib and the shaft. It is contemplated that some or most of the second rib may be crushed or scraped away during insertion of the shaft but that a sufficient amount of the second rib will remain to provide the required interference fit at the minimum tolerance outside diameter of the shaft.

Although not shown in the drawings for clarity of illustration, the ribs 63 and 65 are notched at their outer ends to facilitate the piloting of the shaft 13 into the socket 51 for the reasons and purposes previously stated.

FIGS. 7 and 8 of the drawings show only the hub 21 of a knob in which another modified socket 71 is formed. The socket 71, which is of irregular transverse cross-section, has a flat wall 73 on one side thereof extending into the socket. A coring slot 75 intersects this flat wall and extends into the socket. The socket also includes oppositely-located curved walls 77. Extending out of these curved walls and toward each other on the opposite side of the socket from the flat wall 73 are curved elongated fingers 79 which extend non-radially to the socket 71. These fingers terminate in tips 81 which are located close to but out of contact with each other. The fingers 79 extend substantially the full depth of the socket 71. A stop is provided in the socket to prevent the shaft 13 from being inserted into the bottom of the socket, but this is not shown in the drawings. Flexibility of the fingers 79 is obtained without requiring the ends of the fingers to terminate short of the bottom of the socket because the shaft cannot reach the bottom of the socket.

A rib 82 is formed on each finger 79 near its tip, with the rib projecting into the socket 71 toward the flat wall 73 and extending along its length into the socket substantially to the bottom thereof. The rib 82 is formed with a sufficient cross-section that it will not be crushed or scraped away upon insertion of the shaft 13 into the socket 71. The amount of projection of the rib into the socket will determine the amount of bending of its finger and thus the amount of holding force exerted against the shaft 13 by each finger.

The walls 73 and 77 of the socket are beveled at 83 and 85, respectively, to facilitate the piloting of the shaft 13 into the socket. However, beveling does not eliminate the initial resistance to insertion of the shaft caused by the fingers 79 and ribs 82 which provide a tight gripping action and frictional resistance to the initial entrance of the shaft into the socket 71. It has been found that the amount of force initially required to pilot the shaft into the socket can be eliminated by notching the fingers 79 and the ribs 82 at 87 for a distance into the socket equal to approximately one quarter of the depth of the socket. The notching of the fingers for this distance does not adversely affect the holding power of the fingers relative to the shaft. The notch extends into each finger 79 for a radial distance equal to approximately ten percent of the radius of the socket 71 with the radius being measured from the curved walls 77. Once the shaft is piloted in the socket, it is much easier to apply the additional force required to seat the shaft in the socket. While the bottom of the notch 87 is shown as flat in FIG. 8 of the drawings, it should be understood and appreciated that it may be ramped or curved to better accommodate shafts that do not have beveled tips.

I claim:

1. A molded knob of the type which frictionally engages and slips over the end of a shaft having an outer surface, at least a portion of which outer surface is curved,
   a hub formed as part of said knob,
   a shaft receiving, axially-extending, walled socket formed in said hub,
   said socket having a shaft-receiving portion with a transverse cross-section complimentary to the transverse cross-section of said shaft and having an entrance at one end of said hub to receive said shaft, and
   a pair of elongated fingers formed as part of said hub and located adjacent each other at a curved portion of said socket,
   said fingers extending axially into said socket from the entrance thereof and projecting generally radially into the shaft-receiving portion of said socket with each finger terminating in a tip located close to but out of contact with the tip of the other finger,
   said fingertips extending into said shaft-receiving portion of said socket with each fingertip extending into said socket the greater radial distance on the side of its finger adjacent the other finger than on the side of its finger away from the other finger.

2. The molded knob of claim 1 in which the sum of the radial extensions of said fingertips is greater than the initial distance between the fingertips so that the insertion of the shaft into the shaft-receiving portion of the socket bends the fingers into contact with each other as well as compresses the fingers radially.

3. A molded knob of the type which frictionally engages and slips over the end of a shaft of generally circular cross-section having a curved outer surface,
   a hub formed as part of the knob,
   a shaft-receiving walled socket formed in the hub,
   a pair of elongated fingers formed as part of said hub and extending into said socket, said fingers extending toward each other but terminating in tips out of contact with each other, each finger extending into the socket the full depth thereof,
   a rib formed on each finger near its tip with each rib projected into said socket,
   said rib being engaged with the curved outer surface of said shaft when the shaft is inserted into said socket to bend said fingers away from said shaft,
   said fingers and ribs being notched for a depth equal to approximately one quarter of the depth of the socket to facilitate the insertion of the shaft into the socket.

4. The molded knob of claim 5 in which the notches extend into the fingers for a radial distance equal to approximately ten percent of the radius of the curved fingers.

5. A molded knob of the type which frictionally engages and slips over the end of a shaft of generally circular cross-section having a curved outer surface within the maximum outside diameter permitted by the established range of tolerances for such a shaft,
   a hub formed as part of the knob,
   a shaft-receiving walled socket formed in the hub,
   at least one elongated finger formed as part of said hub and extending into said hub,
   said finger having a tip positioned to engage a shaft inserted in said socket, said tip cooperating with said walled socket to retain said shaft in said socket,
   a notch formed in said tip of said elongated finger at the entrance of said socket and extending into said socket for less than the full length of said finger to clear a shaft inserted into said socket,
   said walled socket being dimensioned to provide a slip fit engagement with said shaft when the maximum outside diameter of the shaft is within the permitted tolerances.

6. The molded knob of claim 5 in which said notch extends into said socket for a distance equal to approximately one quarter of the depth of said socket.

7. A molded knob of the type which frictionally engages and slips over the end of a shaft of generally circular cross-section having a curved outer surface,
   a hub formed as part of the knob,
   a shaft-receiving walled socket formed in the hub,
   a pair of curved, elongated fingers formed as part of said hub and extending into said socket, said fingers extending toward each other but terminating in tips out of contact with each other,
   a first rib formed on each finger near its tip with each rib projecting into said socket,
   a second rib formed on each finger adjacent the base, with said second rib projecting into said socket to a lesser extent than the projection of said first rib,
   said first ribs being engaged by the curved outer surface of said shaft when the shaft is inserted into said socket to bend said curved fingers away from said flat wall, with the projection of the first rib determining the amount of bending of its finger,
   said second ribs being engaged by the curved outer surface of said shaft when the shaft is inserted in said socket to create an interference fit between said shaft and said second ribs.

* * * * *